1,440,275

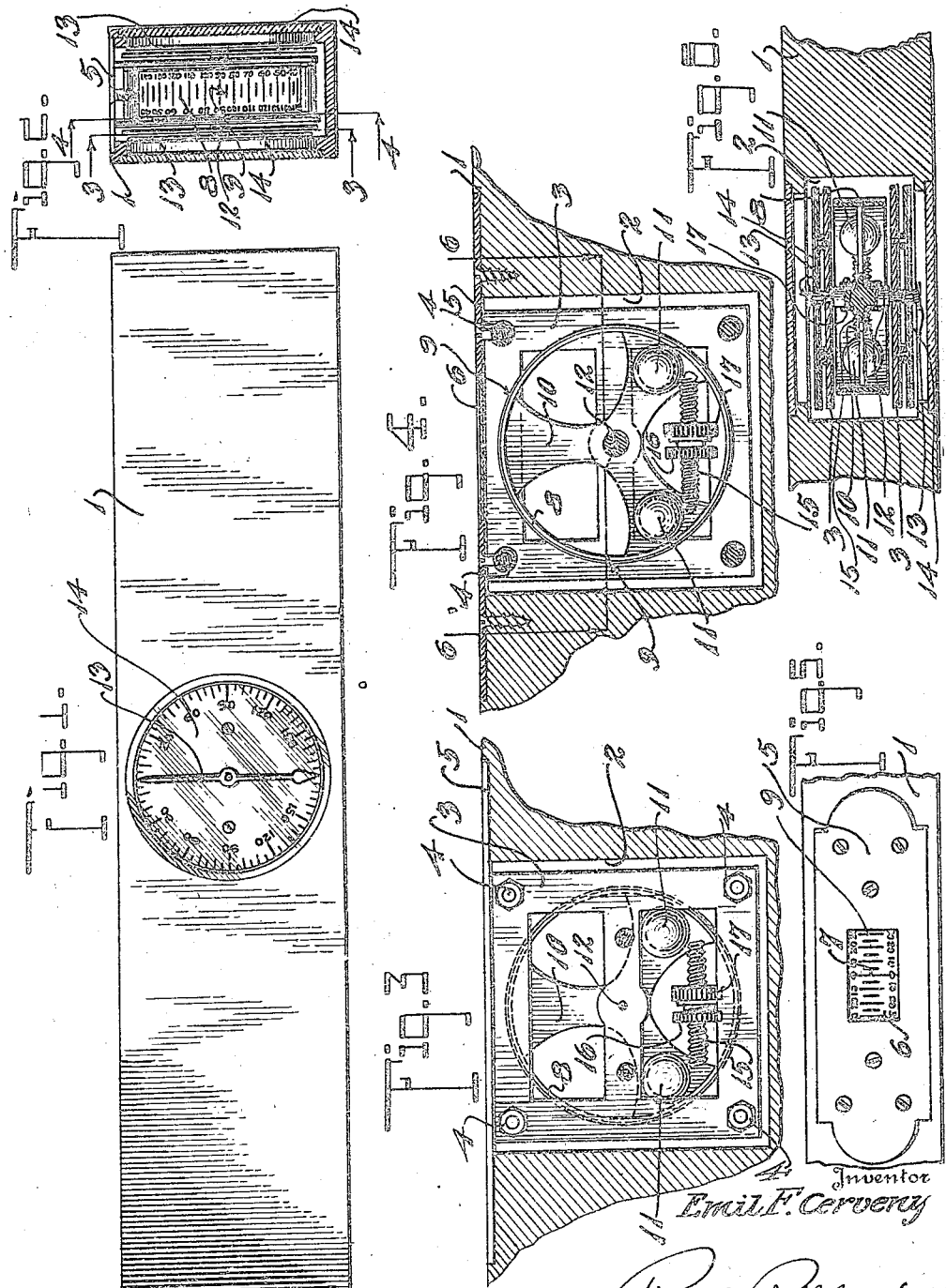
Dec. 26, 1922.
E. F. CERVENY.
ANGLE INDICATING LEVEL AND PLUMB.
FILED AUG. 5, 1921.
1,440,275
Inventor
Emil F. Cerveny Patented Dec. 26, 1922.

UNITED STATES PATENT OFFICE.

EMIL F. CERVENY, OF CHICAGO, ILLINOIS, ASSIGNOR OF ONE-HALF TO SAUL YAVITZ, OF CHICAGO, ILLINOIS.

ANGLE-INDICATING LEVEL AND PLUMB.

Application filed August 5, 1921. Serial No. 489,998.

*To all whom it may concern:*

Be it known that I, EMIL F. CERVENY, a citizen of the United States, residing at Chicago, in the county of Cook and State of Illinois, have invented certain new and useful Improvements in Angle-Indicating Levels and Plumbs, of which the following is a specification.

The present invention appertains to improvements in those implements or devices conventionally known as levels, by means of which not only perpendiculars and horizontals may be determined, but the various angles of inclination may be ascertained or measured.

The invention is characterized as to novelty by the provision of a gravity-operated indicator device mounted upon sensitive bearings and carrying at its periphery suitable graduations capable of being viewed through a sight window from the edge of the implement, said device carrying pointer elements arranged to co-act with stationary indicator dials whereby the angles may be ascertained by viewing the indicator from either side of the instrument. A feature of novelty of this arrangement resides also in the provision of means for adjusting the indicator so as to maintain accuracy in its registration or action with regard to the stationary indicating means.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a side elevation of an instrument constructed in accordance with my invention.

Figure 2 is a transverse sectional view therethrough.

Figure 3 is a sectional view on the plane indicated by the line 3—3 of Figure 2.

Figure 4 is a similar sectional view on the plane indicated by the line 4—4 of Figure 2.

Figure 5 is a fragmentary top plan view.

Figure 6 is a horizontal sectional view on the plane indicated by the line 6—6 of Figure 4.

Throughout the following detailed description and on the several figures of the drawing, similar parts are referred to by like reference characters.

Referring to the drawing, the numeral 1 designates the stock portion of the instrument which may be of any desired material or construction and cut out centrally thereof to form a recess or pocket 2 into which the indicator device forming the special subject-matter of this invention is mounted.

The indicator device comprises the side frame pieces 3 secured together in spaced relation by the fastening means 4 at the corners thereof and supported from the top plate 5 set into the upper edge of the stock in the customary manner. Centrally this supporting plate is provided with a glass-sight opening 6 upon which is delineated an indicator line 7. Between the side frame pieces 3 is mounted an annular indicator member 8, the outer surface of which is provided with suitable graduations as indicated at 9, said graduations being in degrees of a circle and designed to register with the indicator line 7 before mentioned. This annular member is provided with a spider 10 comprising three equally spaced arms and in two of such arms are fixed corresponding or counterbalance weights 11 so that said two arms occupy a position below the center of gravity and cause the indicator to maintain a determined position in the use of the article after the customary manner. The shaft 12 for the annular member 8 is mounted in the frame sides 3 and carries at both of its outer extremities pointers or hands 13 which is designed to co-operate with dials 14 affixed to opposite sides of the respective frame members 3. The stock 1 is cut out with openings corresponding to the area of the dials 14 and a glass window is provided over such openings so as to permit the readings of the indicator to be readily viewed from either side of the instrument.

An important feature of this construction lies in the provision of adjusting means consisting of the screw or threaded shaft 15 connecting the two weighted arms of the spider upon which is carried the adjusting nut 16 and a cooperating lock nut 17. By means of this arrangement the indicator member 8 may be adjusted and such adjustment fixed to insure accuracy of registration of the indicator elements.

The utility of the device hereinbefore described is readily recognized and does not need further description, and it is to be understood that changes may readily be made in the minor details of construction of the device without departing from the spirit of the invention and within the scope of the claim hereto appended.

Having thus described my invention, what I claim as new and desire to secure by Letters Patent is:

An angle indicating level and plumb of the class described comprising a stock having a central recess therein, an indicator device mounted in said recess and comprising a supporting plate having a sight opening bearing an indicator line, a frame sustained by said plate, an annular indicator member mounted in said frame and having its periphery provided with suitable graduations adapted to co-act with the indicator line aforesaid, dial members fixed to the sides of the frame and adapted to be viewed from opposite sides of the stock, pointers mounted upon the indicator member to co-act with the dials, a spider in said indicator member having spaced weight members attached thereto and adjusting means affixed to the spider comprising a threaded shaft, an adjusting nut constituting a balancing weight mounted thereupon, and a lock nut adapted to fix the adjusting nut at an adjusted position.

In testimony whereof I affix my signature.

EMIL F. CERVENY.